July 27, 1943.  F. B. LACHLE  2,325,328
OIL EXTRACTION
Filed July 21, 1941
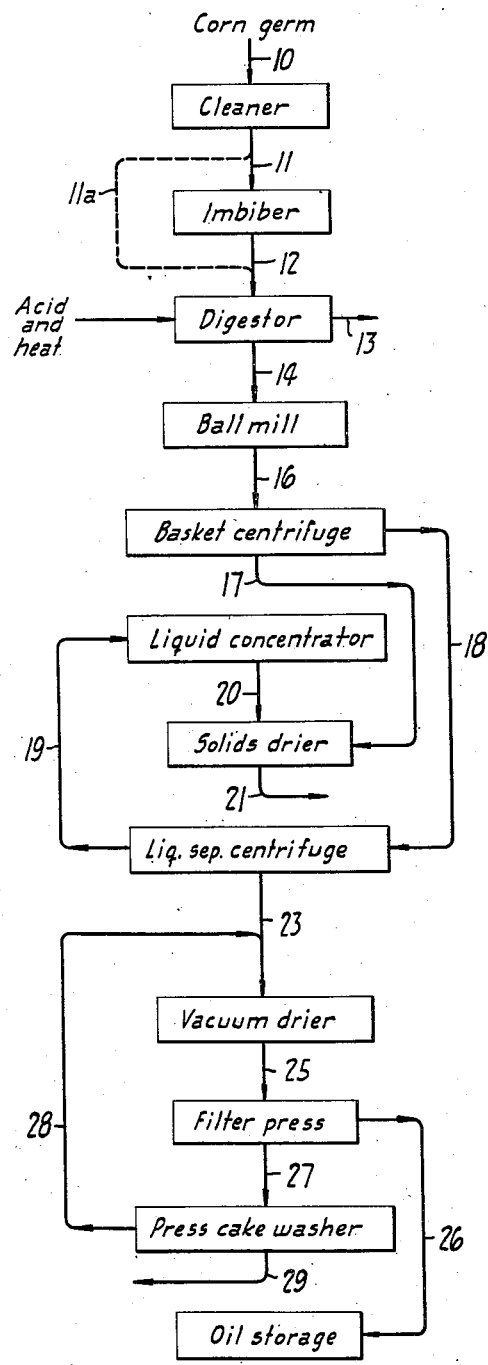
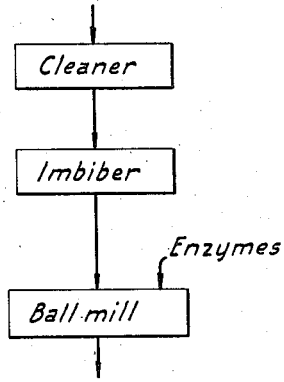
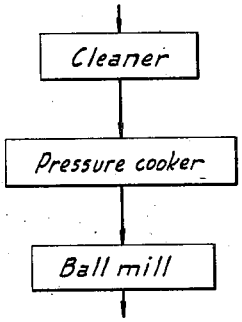
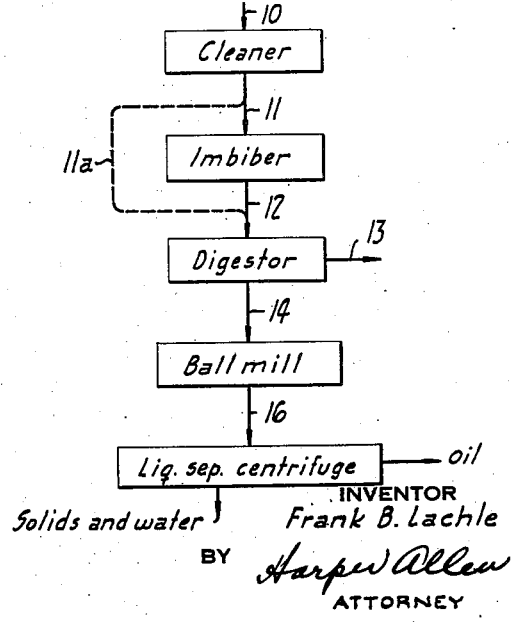
INVENTOR
Frank B. Lachle
BY
ATTORNEY Patented July 27, 1943

2,325,328

UNITED STATES PATENT OFFICE 2,325,328

OIL EXTRACTION

Frank B. Lachle, San Mateo, Calif., assignor to The Schwarz Engineering Company, Inc., San Francisco, Calif., a corporation of Nevada Application July 21, 1941, Serial No. 403,347

7 Claims. (Cl. 195—3)

This invention relates to the field of oil extraction and is concerned more particularly with the provision of an improved oil extracting process for use with oil bearing materials of cellular character, which materials also contain an unliberated constituent, such as starch, which tends to interfere with the oil extracting operation. This application is a continuation in part of my copending application, Serial No. 341,175, filed June 18, 1940, for "Oil extraction."

It is an object of the invention to provide an improved process of extraction oil from cellular oil bearing materials which also have certain unliberated constituents such as starch.

Another object is to provide an oil extracting process of the character referred to in which the oil bearing material is subjected to preliminary treatment to condition it for the oil extracting operation per se.

Another object of the invention is to provide an oil extracting process of the character referred to in which an increase in both quantity and quality of the extracted oil is obtained.

Another object of the invention is to provide a process for extracting oil from materials such as corn germs, wheat germs, cotton seed, peanuts, and other similar materials.

Other objects and advantages of the invention will be apparent from the following description of a preferred manner of carrying out the process, as employed in connection with corn germ.

In the drawing:

Figure 1 is a flow diagram of the complete oil extraction and recovery process carrying out my invention.

Figure 2 is a fragmentary flow diagram illustrating a modified manner of employing my invention.

Figure 3 is also a fragmentary flow diagram illustrating a modified manner of employing my invention.

Figure 4 is also a fragmentary flow diagram illustrating a modified manner of employing my invention.

The present invention relates to the general type of oil extraction process which is described and claimed in my copending application referred to above. As described in said application, the process contemplates the dispersion of material in a liquid medium so that the individual cells are separated to provide for wetting of each cell by the medium as it is separated and to provide for individual treatment of each cell whereby it is crushed or ruptured to have the oil displaced therefrom, or whereby the oil is expelled or expressed through the natural pores of the cells. To effect this result, point pressure is applied to each of the individual oil cells or oil cell groups in the presence of a non-oil-soluble oil-carrying medium, such as water or an aqueous solution. The result preferably is obtained by providing a treating zone filled or partly filled with a displacing medium in which a multitude of point pressure effects are provided repeatedly and successively so that after a period of treatment the mass of material is delaminated to free the individual cells or cell groups and each individual oil cell is free for separate treatment. The point pressure referred to is that provided by surfaces having multitudinous minute asperities of such dimensions as to allow the asperities to practically or actually touch or rub each other so that the oil cell is pressed, cut, broken, squeezed or crushed between pressure surfaces having dimensions in the order of, or less than, the oil cell dimensions. Various surfaces providing a satisfactory type of asperity are referred to hereinafter. The point pressure effect is continued for a period of time sufficient to eliminate or substantially eliminate the oil cell groups and provide a slurry or puree containing individual oil cells and the oil-displacing medium. The same point pressure effect used for delamination is also used to rupture or macerate the oil cells to liberate the oil and allow it to be carried away by the oil-carrying medium or to effect displacement of the oil through the pores of the cells by the application of pressure to the individual cell.

In this way, substantially all of the oil-bearing cells can be treated, and the percentage of oil recovery from various substances can be materially increased. At the same time the process lends itself to the direct production of a crude oil having certain or substantially all of the characteristics of refined oil. In many instances, the crude oil recovered in accordance with this invention needs only certain finishing steps, such as deodorization or clarification, to compare favorably with refined oils which are treated by known processes. Even where the conventional refining process must be employed, it has been found that refining costs are lower with oil produced in accordance with the instant process.

Generally it is desirable that the oil bearing vegetables have a sufficient moisture content to activate the oil plasma which is believed to cause coalescence of the oil by virtue of the hydrophobic character of the oil plasma.

With some vegetables, activation of the oil plasma must be effected by the imbibition of a suitable activating medium, such as water, so that the oil plasma is properly conditioned for the extraction step.

In materials where an imbibition step is required, the oil is believed to exist in the form of an oil plasma wherein the oil is distributed throughout the oil cells in very small particle size, some of which may be ultra-microscopic. The oil plasma is believed generally to be in the form of a fine oil emulsion which is hydrophobic in character. With this type of materials, it is desirable to precede the actual extraction step with a period of imbibition wherein the material is permitted to pick up moisture. This imbibition step may be performed by applying a non-oil-soluble liquid as generally classified, for example by soaking the material in water or by application of steam, or both, to condition the oil plasma for the extraction operation by causing coalescence of the oil into droplets of a size to permit separation.

The imbibition step is preferably effected with the material in its whole state, although with some materials it may be desirable to effect imbibition during or after a comminution step where comminution of the material is desirable.

With certain of the materials, for example material like corn germ, it is desirable to perform a starch reduction step either after or simultaneously with the imbibition step. The reducing step may be performed by subjecting the material to the action of a suitable weak acid, such as sulphuric acid or hydrochloric acid, to reduce the starch content to sugar, so that the starch will be dissolved from the kernel and will not be able to act as an emulsifying agent. The dissolving of the starch from the kernel also serves to expose the germ itself for subsequent treatment. Preferably the reduction step would be carried out with the material in a whole state, although it may be carried out by effecting either a wet or dry comminution of the material followed by application of the acid.

In some materials the imbibition and reduction steps should be effected successively, so that the imbibition step will serve to condition the material for the reduction step. In this way the reduction step may be performed more rapidly or with weaker acid to reduce the possibility of injury to the oil from the acid used in the reduction step and decrease the expense of operation.

After the pretreatment is completed, where required, the oil-bearing material is placed in a treating chamber which contains a non-oil-soluble oil-carrying medium, such as water, and means for first delaminating or disintegrating the material to individual cells or cell groups to provide a dispersion of the individual cells or cell groups in the medium and then for treating the cells individually or while in a layer of approximately cellular thickness. Both the delamination and the subsequent pressure treatment of the cells is preferably effected by means of a multitudinous point pressure effect. Throughout the reduction and treatment, the non-oil-soluble oil-carrying medium should be present in at least sufficient quantity to wet all of the solids of the oil-bearing material in all portions of the treating chamber and not in excess of the amount required for efficient operation. The desired amount of medium provides a complete dispersion of the oil-bearing material in the medium so that the individual cells or cell groups composed of two or more cells are completely surrounded and wetted by the medium. After the treatment is finished the oil-solids-water slurry or puree is usually of the consistency of cream.

With certain materials, it may be desirable to perform a comminuting step of either a fine or coarse nature or both prior to the reduction of the material into cellular or small, multi-cellular particles.

Generally, it may be stated that the treatment of the material in cellular or small multi-cellular particles in a dispersed form in a non-oil-soluble oil-carrying medium is of a character to extract some of the oil by actual rupturing or breaking of the cells to liberate the oil in the medium; some of the oil may be displaced by osmosis; and other portions of the oil will be liberated by complete or partial collapse of the cell walls without rupture. The combined effect of the various types of extraction is to recover a high percentage of the oil present in the material.

The liberation of oil from the individual cells as explained may be carried out at "cold" temperatures, i. e., temperatures in the neighborhood of ordinary room temperature (60° F.) or lower, where this is desirable to provide a high quality oil, otherwise higher temperatures tend to hasten the process. Also, the oil liberation is preferably effected in an acid mixture to minimize the formation of emulsifying agents such as soap. However, extraction may be performed in an alkaline medium.

The means for providing a multitudinous point pressure effect in the treating chamber may take the form of usual surfaces available, such as metal or porcelain, which have a character of minute roughness (even though they may be apparently smooth) to approximate cellular dimensions. Preferably, the pressure surfaces are provided on a plurality of small pressure elements such as balls, pebbles, rods, discs, cubes, rolls or plates and the like, which are loosely confined in a treating chamber and subjected to agitation or vibration so as to repeatedly contact each other. This type of action is provided, for example, by the cascading and sliding action of the pressure elements such as found in a ball mill of conventional design. For certain applications, other equipment for producing individual pressure treatment of the cells, such as a hammer mill or a colloid mill may be employed.

In performing the extraction step with a ball mill, the oil carrying and displacing medium such as slightly acidic water is preferably added first in order to minimize oxidation, and the water may be pre-treated if desired to liberate dissolved air. Subsequently, the oil-bearing material is introduced into the ball mill which is then placed in operation for the requisite period of time which varies with different materials in accordance with the natural characteristics thereof.

The ball mill treatment may be carried out at any selected one of a range of temperatures depending upon the effect heating has on the quality of the oil and the efficiency of the ball mill operation. Usually heat is desirable where it can be employed to aid maceration of the cell wall.

After the required ball mill treatment, the mixture of solid material, water, water solubles, and oil is flushed from the ball mill and subjected to subsequent treatment to recover the oil or any other desired constituents. Various known methods of treatment may be used to recover desired constituents from the slurry.

Figure 1 illustrates a typical flow diagram for a corn germ oil extraction plant. Whole corn germ may be fed as indicated by the line 10 to the cleaner which serves to remove the husky material such as the corn germ caps and other undesirable solid material. The cleaned whole corn germ may be fed as indicated by the line 11 to an imbiber, which may comprise a tank having suitable means for the introduction of water, steam, or both, so that the whole dry corn germ can be treated for the requisite time to effect imbibition of moisture.

As pointed out, the imbibition of moisture conditions the oil plasma of the corn germ for the extraction operation. The imbibed moisture is believed to activate the oil plasma because of its hydrophobic character and is believed to reduce the viscosity of the oil plasma and overcome the forces in the oil plasma which oppose coalescence of the oil. Thus the oil tends to collect in minute droplets during the imbibition step so as to be more readily available for further coalescence during the ball mill treatment.

From the imbiber, the corn germs are fed as indicated by the line 12 to a digester wherein the corn germs are subjected to the action of heat and a suitable starch reducing agent, such as weak sulphuric or hydrochloric acid. As indicated by the dotted line 11a, the imbiber may be by-passed and the imbibition step performed at the same time as the starch reduction step in the digester.

During the starch reduction step, the acid reduces the starch to sugar which may be separated and conveyed for disposal as indicated by the line 13 to a sugar house for example. The sugar may be allowed to remain with the corn germ. During the reduction step, all or substantially all of the water solubles will also be removed from around the corn germ. The reduction step, therefore, serves to expose the corn germ for direct pressure treatment. During the digesting step, heat is also preferably applied, for example by boiling, to speed up the reactions and also to aid in macerating the cell walls of the corn germ.

From the digester the starch-free corn germs may be carried as indicated by the line 14 to the ball mill where they are subjected to the multitudinous point pressure effect in the presence of water. Usually the water employed will be heated and will have been deaerated. The amount of water present is sufficient to produce the desired wetting and dispersion of the oil cells in the slurry, and the consistency of the mixture at the end of the treatment will be similar to that of heavy cream.

After the ball mill treatment, the entire constituents of the slurry including solids, water, water-solubles and oil, are discharged as indicated by the line 16 into a basket centrifuge which serves to separate the solids from the water and oil. The solids from the basket centrifuge may be fed as indicated by the line 17 to the solids dryer, while the mixture of oil and water as indicated by the line 18, is carried to a liquid separator centrifuge where the oil is separated from the water. The water containing the water solubles may be fed from the centrifuge, as indicated by the line 19, back to the liquid concentrator, where it may be concentrated sufficiently for drying, and fed, as indicated by the line 20, to the solids dryer. The dried solids may be carried away as indicated by the line 21 to any suitable point of disposal.

The oil from the liquid separator centrifuge is still wet and may be conveyed as indicated by the solid line 23 to a vacuum dryer. The dry cloudy oil from the vacuum dryer is fed as indicated by the line 25 to a filter press of suitable construction from which the dry brilliant oil is conveyed as indicated by the line 26 to a suitable place of oil storage.

The press cake from the filter press may be carried as indicated by the line 27 to a press cake washer to liberate additional wet oil contained in the press cake, which may be carried from the press cake washer as indicated by the line 28 back to the vacuum dryer for further treatment. The oil-free cake from the press cake washer may be carried to a suitable point of disposal as indicated by the line 29.

In a typical extraction run with the imbibing and digesting steps performed simultaneously, the cleaned whole corn germs were boiled for about 20 minutes in a .3% solution of sulphuric acid, and then treated in the ball mill with the addition of 300 to 400% water on a dry basis for one and one-half hours. Subsequently the oil was recovered as described in connection with Figure 1. A microscopic examination of the solids residue showed that substantially all of the cells had given up their oil.

Another advantageous way of performing the starch reducing step as a preliminary to the ball mill operation is the use of starch reducing enzymes to attack the unliberated starch of the corn germ and reduce such starch to sugar. While the use of starch reducing enzymes has been proposed with respect to the liberated starch of the corn kernel as distinguished from the corn germ, applicant in contrast proposes to use the starch reducing enzymes with respect to the unliberated starch in the corn germ itself, either as a pretreatment in combination with the imbibition step or as a part of the treatment in the ball mill. Thus the starch reducing enzymes may be added to the imbiber during the imbibing step and allowed to remain with the corn germ when transferred to the ball mill, or directly added to the ball mill and allowed to remain in the mixture during the ball mill operation.

The use of the starch reducing enzymes in the ball mill itself enables presentation of a surface of considerable and increasing area to the enzymes as the ball mill operation proceeds. In this way the starch reducing action can be carried out within a much shorter time than would otherwise be possible. During such treatment, it is desirable to maintain the temperature of the ball mill below a lethal temperature for the enzymes, say below 130° F., so that the enzymes will remain active and will not be killed. This method of starch reduction also provides an effective way of eliminating the starch from the corn germ and presenting the corn germ itself free of starch for the impact treatment in the ball mill operation. This method provides for reduction of the starch as it is liberated in the preliminary stages of the ball mill action and enables liberation of the oil without the emulsifying action which would be accompanied by the presence of liberated starch.

Figure 3 illustrates a third method of starch reduction wherein pressure cooking is utilized with live steam, say at a gauge pressure of 50 lbs., although slightly lower pressures can be employed. This treatment enables the feeding of material directly from the cleaner to the pressure cooker and thence to the ball mill as indicated in Figure 3. In the pressure cooker the steps of imbibition and starch reduction will be carried on simultaneously, the imbibition being accelerated by the heat treatment. It has been found that this type of treatment not only serves to reduce the starch and effect imbibition, but also provides for maceration of the cell walls and a conditioning of such walls for liberation of the oil. During such treatment some of the solids are also placed in solution which would not otherwise occur during the imbibition or ball mill step where the pressure and heat are lacking. The pressure heating also serves to aid coalescence of the oil, to effect coagulation of the proteins, and to liberate some anti-emulsifying factors of the material to provide increased resistance to emulsification of the oil. It is seen, therefore, that the treatment with heat under pressure provides a number of advantageous operating conditions to prepare the material for efficient treatment in the ball mill operation.

The modified method illustrated in Figure 4 involves a special type of centrifuging operation in which a single stage of centrifuging is enabled by control of the grinding in the ball mill to obtain the desired particle size. I have found that by properly controlling the particle size in relation to the viscosity of the mixture, the solids particles will pass out with the water phase from a liquid separating centrifuge. In general with an increase in the viscosity of the mixture, a larger particle size can be handled without interfering with the separating operation. This separating operation is preferably carried out while the mixture is still hot from the imbibing and ball mill operations and is continuous during any single separating treatment, that is, once the centrifuge is set in operation it should not be stopped until the operation is completed.

It is believed that when the material is properly conditioned as to particle size and viscosity, the solids particles build up a layer of a definite thickness on the walls of the centrifuge and that thereafter the velocity of the material in passing through the centrifuge will maintain an annular passage which remains of a practically constant cross-section. When the above relation has been established, solids particles of the material will pass out with the water phase. In this way, the centrifuging operation can be carried out as one step. Otherwise, the material may be processed as described above.

I claim:

1. An oil extraction process for cellular oil-bearing material containing unliberated starch, which comprises subjecting the material to a starch reducing action to change the starch content to sugar, and subjecting the material to a multitudinous point pressure effect in the presence of an aqueous medium to liberate the oil from the oil cells.

2. An oil extraction process for cellular oil-bearing material containing unliberated starch, which comprises heating the material while moist under pressure, and then subjecting the resulting material to a multitudinous point pressure effect in the presence of an aqueous medium to liberate the oil from the oil cells.

3. An oil extraction process for cellular oil-bearing material containing unliberated starch, which comprises subjecting the material to steam under a pressure of about 50 lbs. absolute, and then subjecting the material to a multitudinous point pressure effect in the presence of an aqueous medium to liberate the oil from the oil cells.

4. An oil extraction process for cellular oil-bearing material containing unliberated starch, which comprises subjecting the material to the action of starch reducing enzymes, and then subjecting the resulting mixture to a multitudinous point pressure effect in the presence of an aqueous medium to liberate the oil from the oil cells.

5. An oil extraction process for cellular oil-bearing material containing unliberated starch, which comprises subjecting the material to a multitudinous point pressure effect in the combined presence of an aqueous medium and starch reducing enzymes.

6. An oil extraction process for cellular oil-bearing material containing starch which comprises causing the material to imbibe moisture to a point of substantial saturation, then subjecting the material to the action of an acid digester to reduce the starch content to sugar, then subjecting the material to a ball mill effect to place the material in cellular form in dispersed condition in an aqueous medium and at the same time to apply pressure to the individual cells, thus effecting liberation of the oil therefrom, and then recovering the oil from the slurry resulting from the ball mill treatment.

7. An oil extraction process for cellular oil-bearing material containing starch which comprises subjecting the material to the action of a starch reducing agent so as to reduce the starch to sugars and allow or cause the material to imbibe moisture to a point of substantial saturation, then subjecting the material to a treatment to place the material in cellular form in dispersed condition in an aqueous medium and at the same time to apply pressure to the individual cells so as to effect liberation of the oil therefrom, and then recovering the oil from the slurry resulting from the ball mill treatment.

FRANK B. LACHLE.